(12) United States Patent
Jacoby et al.

(10) Patent No.: US 11,225,051 B2
(45) Date of Patent: Jan. 18, 2022

(54) ALUMINIUM MULTI-LAYERED BRAZING SHEET PRODUCT AND FLUXLESS BRAZING METHOD

(71) Applicant: Aleris Rolled Products Germany GmbH, Koblenz (DE)

(72) Inventors: Bernd Jacoby, Limburg (DE); Steven Kirkham, Ransbach-Baumbach (DE); Arne Schlegel, Aachen (DE)

(73) Assignee: Aleris Rolled Products Germany GmbH, Koblenz (DE)

( * ) Notice: Subject to any disclaimer, the term of this patent is extended or adjusted under 35 U.S.C. 154(b) by 0 days.

(21) Appl. No.: 16/075,827

(22) PCT Filed: Jan. 23, 2017

(86) PCT No.: PCT/EP2017/051278
§ 371 (c)(1),
(2) Date: Aug. 6, 2018

(87) PCT Pub. No.: WO2017/137236
PCT Pub. Date: Aug. 17, 2017

(65) Prior Publication Data
US 2019/0077119 A1 Mar. 14, 2019

(30) Foreign Application Priority Data
Feb. 9, 2016 (EP) .................................. 16154886

(51) Int. Cl.
*B23K 35/02* (2006.01)
*B32B 15/01* (2006.01)
(Continued)

(52) U.S. Cl.
CPC ........ *B32B 15/016* (2013.01); *B23K 35/0238* (2013.01); *B23K 35/286* (2013.01);
(Continued)

(58) Field of Classification Search
None
See application file for complete search history.

(56) References Cited

U.S. PATENT DOCUMENTS 5,398,864 A * 3/1995 Eichhorn ............. B23K 35/286
228/183
7,255,932 B1 * 8/2007 Kilmer ................. B23K 35/002
428/654
(Continued)

FOREIGN PATENT DOCUMENTS

DE 202013101870 U1 6/2013
EP 1306207 A1 5/2003
(Continued)

OTHER PUBLICATIONS

Aluminum Alloy AA4043 composition datasheet—Matweb—http://www.matweb.com/search/datasheet_print.aspx?matguid=01e63ba5b064416c94eb5f8ed8bbf50c] (Year: 2010).*
(Continued)

*Primary Examiner* — Devang R Patel
(74) *Attorney, Agent, or Firm* — Kilpatrick Townsend & Stockton LLP

(57) ABSTRACT

A multi-layered brazing sheet product having an aluminium core alloy layer provided on one or both sides with a brazing clad layer material, and an inter-layer material positioned between the aluminium core alloy layer and at least one of the brazing clad layer materials, wherein the brazing layer material(s) is made from an 4xxx-series aluminium alloy having 5% to 15% Si and up to 3% Mg, and wherein the inter-layer material is made from a 1xxx-series aluminium alloy having a purposive addition of Mg of 0.10% to 2.0%. The invention relates also to the use of the brazing sheet product in a fluxless controlled atmosphere brazing process.

13 Claims, 1 Drawing Sheet

Figure 1:
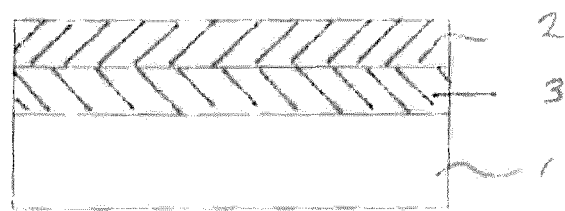

(51) Int. Cl.
*C22C 21/02* (2006.01)
*B23K 35/28* (2006.01)
*C22C 21/14* (2006.01)
*F28F 21/08* (2006.01)
*C22C 21/00* (2006.01)

(52) U.S. Cl.
CPC .............. *C22C 21/00* (2013.01); *C22C 21/02* (2013.01); *C22C 21/14* (2013.01); *F28F 21/084* (2013.01)

(56) References Cited

U.S. PATENT DOCUMENTS

| | | | | |
|---|---|---|---|---|
| 7,648,776 | B2* | 1/2010 | Vieregge | B23K 35/0238 228/262.51 |
| 8,763,880 | B2* | 7/2014 | Wittebrood | C22C 21/02 228/56.3 |
| 10,179,379 | B2* | 1/2019 | Ren | B23K 35/0238 |
| 2007/0099023 | A1* | 5/2007 | Dulac | C23C 30/00 428/654 |
| 2007/0204935 | A1 | 9/2007 | Safrany et al. | |
| 2008/0274367 | A1 | 11/2008 | Kilmer et al. | |
| 2014/0272463 | A1* | 9/2014 | Marois | B23K 35/286 428/654 |
| 2015/0053751 | A1* | 2/2015 | Eckhard | C22C 19/056 228/117 |
| 2015/0118517 | A1* | 4/2015 | Itoh | C22C 21/00 428/654 |
| 2016/0325367 | A1 | 11/2016 | Eckhard et al. | |

FOREIGN PATENT DOCUMENTS

| | | |
|---|---|---|
| EP | 1430988 A1 | 6/2004 |
| EP | 2259002 A1 | 12/2010 |
| EP | 2660043 A1 | 11/2013 |
| EP | 2883650 A1 | 6/2015 |
| WO | 2004112992 A2 | 12/2004 |
| WO | 2007042206 A1 | 4/2007 |

OTHER PUBLICATIONS

International Search Report and Written Opinion dated Feb. 22, 2017 for PCT/EP2017/051278 to Aleris Rolled Products Germany GMBH filed Jan. 23, 2017.
Chinese Application No. 201780009577.0, Office Action, dated Jan. 5, 2021, 23 pages.
Chinese Application No. 201780009577.0, Office Action, dated Jun. 24, 2020, 10 pages.
Chinese Application No. 201 780009577.0, Notice of Decision to Grant, dated Apr. 2, 2021, 4 pages.

* cited by examiner

ALUMINIUM MULTI-LAYERED BRAZING SHEET PRODUCT AND FLUXLESS BRAZING METHOD

CROSS-REFERENCE TO RELATED APPLICATIONS

This is a § 371 National Stage Application of International Application No. PCT/EP2017/051278 filed on Jan. 23, 2017, claiming the priority of European Patent Application No. 16154886.2 filed on Feb. 9, 2016.

FIELD OF THE INVENTION

The invention relates to a multi-layered brazing sheet product made of an aluminium core alloy layer provided one or both sides with a brazing clad layer material, and an inter-layer positioned between the aluminium core alloy layer and at least one of said brazing clad layer materials. The present invention relates also to a method of fluxless brazing in a controlled atmosphere brazing process using such a multi-layered brazing sheet product. In addition, the invention relates to the use of the brazing sheet product in a fluxless controlled atmosphere brazing process. The invention further relates to a brazed heat exchanger comprising various components wherein at least one component being made from the multi-layered brazing sheet product according to this invention.

BACKGROUND OF THE INVENTION

Substrates of aluminium or aluminium alloy in the form of a sheet or an extrusion are used to make shaped or formed products. In some of these processes parts of (shaped) aluminium comprising substrates are interconnected. One end of a substrate may be connected with the other end or one substrate may be assembled with one or more other substrates. This is commonly done by brazing, a technique well known to the person skilled in the art. In a brazing process, a brazing filler metal or brazing alloy is applied to at least one portion of the substrate to be brazed. After the substrate parts are assembled or combined, then they are heated until the brazing metal or brazing alloy melts to join the individual parts to one another. The melting point of the brazing material is lower than the melting point of the aluminium substrate or aluminium core sheet.

Brazing sheet products find wide applications in heat exchangers and other similar equipment. Conventional brazing sheet products have a core of rolled sheet, typically, but not exclusively an aluminium alloy of the 3xxx-series, having on at least one surface of the core sheet an aluminium clad layer (also known as an aluminium cladding layer or brazing clad layer material). The aluminium brazing clad material is made of a 4xxx-series alloy comprising silicon in an amount in the range of 2% to 20% by weight, and preferably in the range of about 5% to 15% by weight. The aluminium brazing clad layer may be coupled or bonded to the core alloy in various ways known in the art, for example by means of roll bonding, cladding spray-forming or semi-continuous or continuous casting processes, for example as disclosed in patent document WO-2004/112992 (Alcan). These aluminium brazing clad layers have a liquidus temperature typically in the range of about 540° C. to 615° C.

There are various brazing processes in use for the industrial scale manufacturing of heat exchangers.

There is vacuum brazing which is carried out at relatively low atmosphere pressure in the order of about $1\times10^{-4}$ mbar or less and is a discontinuous process and puts high demands on material cleanliness. To obtain optimum conditions for joining to take place, Al—Si brazing alloys commonly used for vacuum brazing contain purposive additions of Mg of 1% or more. The Mg destroys the hard oxide film of the filler alloy when it evaporates from the brazing sheet during brazing, and further the evaporated Mg plays the role as getter that removes oxygen and moisture remaining in the vacuum brazing furnace. There is always more magnesium present in the furnace then necessary. The excess magnesium condenses on the cold spots in the vacuum brazing furnace and has to be removed frequently. The capital investment for suitable equipment is relatively high.

NOCOLOK (registered trademark) flux brazing has been used as the principal brazing process to braze automotive heat exchangers by many heat exchanger manufacturers. Major problems that have arisen from the NOCOLOK process have been brazing flux costs, flux handling and the damage brazing flux causes to the furnaces. Also, in complex shaped assemblies the application of the brazing flux prior to brazing at the interior of the assemblies is often considered very difficult and problematic. Consequently, most of the heat exchanger manufacturers have been trying to reduce brazing flux consumption.

Another brazing process is controlled atmosphere brazing ("CAB") without using a brazing flux.

Patent document EP-1430988-A (Furukawa) discloses for such a CAB process without using a brazing flux that the brazing sheet is provided with a core alloy containing Mg in a range of 0.05% to 1.0%. Interposed between the core alloy and the filler alloy there is present a diffusion prevention layer such an Mg-free AA3003-series aluminium alloy.

Patent document EP-1306207-B1 (Sky Aluminium) discloses another fluxless brazing process in an inert gas atmosphere. It also discloses a brazing sheet product comprising of an aluminium core alloy on one or both sides clad with an Al—Si alloy filler alloy with 0.1-5% of Mg and 0.01-0.5% of Bi as an intermediate layer, and a thin covering material clad onto the Al—Si alloy brazing alloy. It is suggested that during a brazing operation the filler material in the intermediate layer is molten as the temperature is elevated during brazing, but oxidation of the surface of the filler material does not occur because the surface is covered with the thin covering material which remains solid. When the temperature is further elevated, the portions with lower melting points, such as a segregation portion of the thin covering material close to the molten filler material, are locally molten, and then the filler material seeps and spreads over the surface of the thin covering material due to volumetric expansion. The surface of the filler material then becomes an emerging face without an oxidation film, and new intensive oxidation does not proceed due to the inert gas atmosphere.

Patent document EP-2660043-A1 (Hydro Aluminium) discloses aluminium brazing sheet product wherein the Al—Si filler layer has been etched to facilitate fluxless brazing. The etching of the Al—Si filler layer includes an alkaline or acidic etchant.

Patent document US-2007/0099023-A1 (Alcan) discloses an aluminium core alloy clad on at least one side with an Al—Si filler layer and wherein the core comprises 0.01-0.5% of Bi and/or 0.05-0.5% of Y to facilitate fluxless brazing under a controlled atmosphere.

Patent document US-2007/0204935-A1 (Alcan) discloses a method of fluxless brazing whereby the sheets prior to brazing are etched in an acid solution and which can be preceded by alkaline etching. The sheet material comprises for an example a brazing sheet product made from an AA3916 core alloy clad on both sides with a filler material layer an AA4045 alloy.

Patent document EP-2883650-A1 (Hydro Aluminium) discloses a pre-treatment of aluminium brazing sheet for fluxless brazing, wherein the surface of the aluminium filler layer has been pickled with an acidic aqueous pickling solution comprising at least a mineral acid and at least one complexing agent or complexing mineral acid, and wherein the material removal during the pickling is between 0.05-6 g/m$^2$, and most preferably between 0.2-0.4 g/m$^2$. Preferred Al—Si filler materials are selected from the group of AA4343, AA4045 and AA4047.

There is a demand for an improved brazing sheet product suitable for use in fluxless brazing in a controlled atmosphere.

DESCRIPTION OF THE INVENTION

As will be appreciated herein below, except as otherwise indicated, aluminium alloy designations and temper designations refer to the Aluminium Association designations in Aluminium Standards and Data and the Registration Records, as published by the Aluminium Association in 2015 and well known to the person skilled in the art.

For any description of alloy compositions or preferred alloy compositions, all references to percentages are by weight percent unless otherwise indicated. The term "up to" and "up to about", as employed herein, explicitly includes, but is not limited to, the possibility of zero weight-percent of the particular alloying component to which it refers. For example, up to 0.3% Ti may include an alloy having no Ti.

And for the purpose of this invention, and as used hereinafter, the term "controlled atmosphere brazing" or "CAB" refers to a brazing process which utilizes an inert atmosphere, for example, nitrogen or argon in the brazing of the various alloy articles, and is distinct from vacuum brazing in particular in that with CAB the brazing atmosphere in the furnace during the brazing operation is at about atmospheric pressure, although a slight under-pressure (for example working at a pressure of 0.1 bar or more) or a slight over-pressure can be used to facilitate the control of the inert atmosphere and to prevent an influx of oxygen containing gas into the brazing furnace. "Core" means an aluminium alloy which is the structural support for the aluminium alloy that is used as the filler. "Filler" means an aluminium-silicon alloy which is used to braze the core or other aluminium articles. "Fillet" means a concave junction between two surfaces.

It is an object of the present invention to provide brazing sheet product that can be used in a method of fluxless brazing in a controlled atmosphere.

This and other objects and further advantages are met or exceeded by the present invention providing a multi-layered brazing sheet product having an aluminium core alloy layer comprising on one or both sides or faces a brazing clad layer material, and an inter-layer material or layer positioned between the aluminium core alloy layer and at least one of said brazing clad layer materials, wherein the brazing clad layer material(s) is made from an 4xxx-series aluminium alloy having 5% to 15% Si and up to 3% Mg, and preferably up to 0.9% Mg, and wherein the inter-layer material is made from a 1xxx-series aluminium alloy having a purposive addition of Mg of 0.10% to 2.0%.

In accordance with the invention it has been found that the purposive addition of Mg to the inter-layer material facilitates a good fillet formation when used in a fluxless controlled brazing operation. Part of the Mg diffuses from the inter-layer material into the filler metal during the temperature rise in the heat-up cycle in a regular brazing operation and during the brazing operation itself and breaks the oxide film on the surface of the brazing clad layer material.

In order to further facilitate a good fillet formation when used in a fluxless controlled brazing operation the outer-surface of the brazing clad layer material can be pre-treated by means of etching with an alkaline or acidic etchant making the material less sensitive against trace oxygen in the inert gas atmosphere. The etching is reducing the amount of oxides at the outer-surface of the brazing filler material and which may otherwise hinder a good fillet formation during brazing.

However, in accordance with the invention it has been found that it can only be put into reliable practice and providing for a good fillet formation when the inert gas atmosphere is dry, and furthermore provided the oxygen content in the inert atmosphere is low and there is a presence of Mg of at least 0.10% in the inter-layer. Based on a series of experiments it has been found that if there less than 0.05% Mg or no Mg is present, for example when using a filler material based on AA4343, AA4045 or AA4047 in combination with a Mg-free 1xxx-series inter-layer material, then a good fillet formation can only be obtained when the oxygen content in the dry inert gas atmosphere is less than 4 ppm and preferably even lower. In some cases no good fillet formation occurred at oxygen levels as low as 2 ppm. However, when a purposive addition of Mg is present then a good fillet formation can be obtained while having a substantial amount of oxygen in the dry inert gas atmosphere. If the oxygen content exceeds 35 ppm no good fillet formation occurs, and preferably the oxygen content is less than 25 ppm, and more preferably less than 20 ppm. As it is very difficult to arrive at and to maintain a very low oxygen content of less than 5 ppm in industrial scale controlled atmosphere brazing furnaces, the present findings allow for fluxless CAB brazing at achievable oxygen levels in the inert gas atmosphere. This provides a significant cost benefit.

The inter-layer or inter-liner is made from an aluminium alloy of the 1xxx-series alloys together with a purposive addition of Mg of 0.10% to 2.0%. A preferred upper-limit for the Mg addition is 1.5%. A higher Mg-content may tolerate a higher oxygen content in the inert atmosphere; however, a too high Mg content is detrimental for the brazing operation itself and for that reason it should not exceed 2.0%, and a preferred upper-limit for the Mg content is 1.5%, and more preferably 1.0%, and more preferably 0.70%. The Mg content in the inter-liner layer is at least 0.10%, and preferably at least 0.15%, and a more preferred lower limit is 0.20%.

Although the brazing layer material facing the inter-liner may comprise some Mg, on a preferred basis the Mg-content is low and it is preferred that the Mg-content in the inter-layer is higher than the Mg-content in the brazing layer material, if present, to facilitate a rapid diffusion thereof during the brazing cycle.

Preferred alloys are those having a composition besides the purposive Mg addition within the ranges of AA1050, AA1060, AA1100, AA1300, AA1350, AA1350A, AA1370 and AA1235.

In a preferred embodiment the interlayer has a thickness of 60 μm or less, for example of about 40 μm or about 50 μm, and is to control the diffusion of alloying elements, e.g. Si, from the core layer to the brazing layer, and as such limits inter-granular corrosion propagation through the core layer in the post-braze condition, and thereby significantly improves the post-braze corrosion performance of the brazing sheet product when applied in a heat exchanger, in particular a charge air cooler. The defined 1xxx-series inter-layer also provides galvanic protection to the aluminium core alloy in combination with facilitating a good fillet formation when used in a fluxless controlled brazing operation.

In an embodiment of the invention, the brazing clad layer material or Al—Si brazing filler alloy has the following composition, consisting of, in wt. %:

| | |
|---|---|
| Si | 5% to 15%, preferably 8% to 14%, |
| Mg | up to 3%, preferably up to 0.90%, and more preferably up to 0.5%, and most preferably up to 0.15%, |
| Fe | up to 0.8% |
| Cu | up to 0.3%, preferably up to 0.1%, |
| Mn | up to 0.8%, preferably up to 0.2%, |
| Zn | up to 0.25% |
| Ti | up to 0.3%, | unavoidable impurities each <0.05%, total <0.2%, and balance aluminium.

Optionally the brazing clad layer material may further comprise a purposive addition of one or more wetting elements selected from the group consisting of: Bi 0.03% to 0.5%, Pb 0.03% to 0.5%, Sb 0.03% to 0.5%, Li 0.03% to 0.5%, Se 0.03% to 0.5%, Y 0.03% to 0.5%, Th 0.03% to 0.5%, and the sum of these elements being 0.5% or less.

The core alloy of the multi-layered aluminium brazing sheet is made of an aluminium alloy from the 3xxx, 5xxx, 6xxx or 7xxx-series alloys, in particular from an AA3003, AA3103, AA3005, AA3105, AA6060, AA6063 or AA6951-type alloy, or modifications thereof.

In a preferred embodiment of the multi-layered brazing sheet material the core alloy is made from a 3xxx-series alloy having a composition consisting of:

| | |
|---|---|
| Mn | 0.8% to 1.5%, preferably 0.8% to 1.40%, |
| Si | 0.25% to 0.75% |
| Cu | 0.5% to 1.1% |
| Fe | up to 0.45% |
| Mg | up to 0.35% |
| Cr | up to 0.25% |
| Zr | up to 0.25% |
| Ti | up to 0.20% |
| Zn | up to 0.15%, | unavoidable impurities each <0.05%, total <0.2%, and balance aluminium.

The multi-layered brazing sheet material according to the invention has a typical thickness at final gauge in the range of about 0.1 mm to 3 mm, and preferably of 0.1 mm to 1.2 mm, for example 0.2 mm or 0.5 mm or 0.8 mm. Each brazing clad layer has typically a thickness of 5% to 15% of the total thickness, for example of about 10%.

Depending on the application of the multi-layered brazing sheet product the core alloy layer can be provided on one side of its surface with a brazing clad layer material and an inter-layer interposed there between or it can be provided on both sides with a brazing clad layer material and on each side an inter-layer interposed there between. Alternatively the core layer can be provided on one side of its surface with a brazing clad layer material and an inter-layer material interposed there between whereas on the other surface of the core layer there is provided a corrosion protective water-side liner material or a brazing clad layer material devoid of an inter-layer material between the core layer and the brazing clad layer material.

Figure 2:
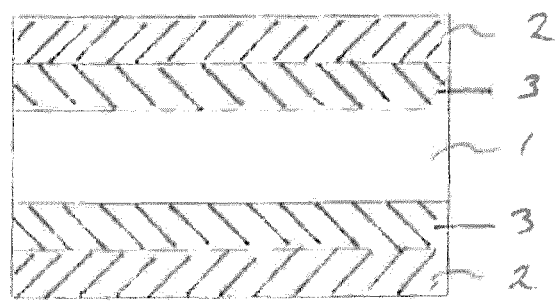
Figure 3:
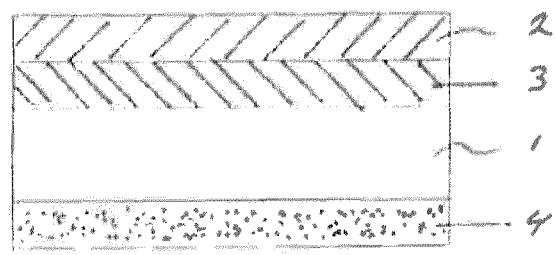

The invention shall also be described with reference to the appended FIG. 1 to FIG. 3 showing a schematic representation of the multi-layered brazing sheet product according to this invention.

FIG. 1 shows a schematic representation of an embodiment of the multi-layered brazing sheet product formed by an aluminium alloy core layer (1) on one surface clad with an Al—Si brazing clad layer material (2) and interposed between the core layer (1) and brazing clad layer material (2) there is an inter-layer material (3) made from an 1xxx-series alloy having a purposive addition of Mg.

FIG. 2 shows another embodiment of the multi-layered brazing sheet product in which starting from the embodiment of FIG. 1 the other surface of the core layer is also provided with an Al—Si brazing clad layer material (2) and interposed between the core layer (1) and brazing clad layer material (2) there is also an inter-layer material (3) made from a 1xxx-series alloy having a purposive addition of Mg.

FIG. 3 shows another embodiment of the multi-layered brazing sheet product in which starting from the embodiment of FIG. 1 the other surface of the core layer (1) is provided with a waterside liner material (4).

In an embodiment the waterside liner material is made from an 3xxx-series aluminium alloy, and more preferably it is made of an aluminium alloy consisting of:

| | |
|---|---|
| Mn | 0.5% to 1.8%, preferably 0.6% to 1.3%, more preferably 0.75% to 1.0%, |
| Zn | 1% to 3.5%, preferably 1.5% to 3%, |
| Mg | <0.3%, preferably <0.10%, |
| Si | <1.2%, preferably <0.5%, |
| Fe | <0.8%, preferably <0.5%, |
| Cu | <0.8%, preferably <0.1%, |
| Ti | <0.25%, preferably 0.01% to 0.12%, | unavoidable impurities each <0.05%, total <0.2%, remainder aluminium.

At too high Zn-levels, in particular with thin gauge materials, too much Zn may diffuse into the core alloy during the heat-up and the brazing cycle. Furthermore, a too high Zn content may lead to evaporation of Zn from the liner during the heat-up and the brazing cycle.

The waterside liner has typically a thickness of 3% to 20% of the total thickness of the 4-layered brazing sheet structure, for example of about 15%. In an embodiment the waterside liner has a gauge in the range of 25 μm to 70 μm, for example of about 30 μm or about 40 μm, to provide the required corrosion resistance.

In another aspect of the invention it relates to a brazing method using the multi-layered brazing sheet product and its preferred embodiments, the method relates to manufacturing an assembly of joined components, in particular a heat exchanger, joined by brazing in a controlled atmosphere brazing process, comprising the steps of:

(a) providing of the components to be brazed together of which at least one is made from a multi-layered brazing sheet product having an aluminium core alloy layer provided one or both sides with a brazing clad layer material, and an inter-layer positioned between the aluminium core alloy layer and at least one of said brazing clad layer materials, wherein the brazing layer material(s) is made from an 4xxx-series aluminium alloy having 5% to 15% Si and up to 3% Mg, preferably up to 0.90% Mg, and more preferably up to 0.5%, and wherein the inter-layer is made from an 1xxx-series aluminium alloy having a purposive addition of Mg of about 0.10% to 2.0%, and wherein preferably the outer-surface of the brazing clad layer material(s) has been pre-treated by means of etching with an alkaline or acidic etchant, (b) assembling the components into an assembly;

(c) brazing the assembly without applying brazing flux onto the assembly components, and brazing the whole assembly in a dry inert gas atmosphere at a brazing temperature, preferably at a temperature in a range of about 540° C. to 615° C., for example at about 590° C. or at about 600° C., for a period long enough for melting and spreading of the brazing clad layer materials, for example a dwell time of about 1 to 10 minutes, preferably of about 1 to 6 minutes, typically at around 2 or 4 minutes, to form a fillet between the multi-layered brazing sheet product and at least one other component; and wherein the oxygen content of the dry inert gas atmosphere is controlled to be less than 35 ppm, preferably less than 25 ppm;

(d) cooling of the brazed assembly, typically to below about 100° C., e.g. to ambient temperature.

The brazing inert gas atmosphere should be dry, meaning that the dew point is less than −40° C., and more preferably of −45° C. or even lower.

In another aspect of the invention it relates to the use or method of use of a multi-layered brazing sheet product having an aluminium core alloy layer provided one or both sides with a brazing clad layer material, and an inter-layer positioned between the aluminium core alloy layer and at least one of said brazing clad layer materials, wherein the brazing layer material(s) is made from an 4xxx-series aluminium alloy having 5% to 15% Si and up to 3% Mg, preferably up to 0.9% Mg, and more preferably up to 0.5%, and wherein the inter-layer is made from a 1xxx-series aluminium alloy having a purposive addition of Mg of 0.10% to 2.0%, and preferably the outer-surface of the brazing clad layer material(s) having been pre-treated by means of etching with an alkaline or acidic etchant, and applied or used in a fluxless controlled atmosphere brazing process performed in a dry inert gas atmosphere at a brazing temperature for a period long enough for melting and spreading of the brazing clad layer material to form a fillet between the multi-layered brazing sheet product and another component, and wherein the oxygen content of the dry inert gas atmosphere is controlled to be less than 35 ppm, preferably less than 25 ppm, more preferably less than 20 ppm. Preferably, the oxygen content of the dry inert gas atmosphere is controlled to be at least 5 ppm.

Preferred embodiments of the multi-layered brazing sheet product and of the brazing process conditions have been set out herein when describing the product and method according to this invention.

The multi-layered brazing sheet product and the brazing method according to this invention have proven to be of particular use in the production of heat exchanger devices having very high requirements on inner cleanliness, in particular oil coolers and charge-air-coolers. These heat exchangers are not suitable for production by vacuum brazing either due to their large size or for economic reasons.

The invention is not limited to the embodiments described before, which may be varied widely within the scope of the invention as defined by the appending claims.

The invention claimed is:

1. A method of manufacturing an assembly of joined components, joined by brazing in a controlled atmosphere brazing process, the method comprising the steps of:

(a) providing of components to be brazed together of which at least one is made from a multi-layered brazing sheet product having an aluminium core alloy layer provided on one side with a brazing clad layer material and an inter-layer positioned between the aluminium core alloy layer and said brazing clad layer material, and is provided with a corrosion protective layer on the other side, wherein the brazing clad layer material is made from a 4xxx-series aluminium alloy having, in weight percent, 5% to 15% Si and greater than 0.05% to 0.5% Mg, and wherein the inter-layer is made from a 1xxx-series aluminium alloy having, in weight percent, a purposive addition of Mg of 0.10 to 1.5%, wherein Mg is purposively present in the brazing clad layer material and wherein the Mg-content in the inter-layer is higher than the Mg-content in the brazing clad layer material;

wherein the corrosion protective layer is made from a 3xxx-series aluminium alloy consisting of, in weight percent: Mn 1.0% to 1.8%, Zn 1% to 3.5%, Ti 0.01% to <0.25%, remainder aluminium and unavoidable impurities each <0.05%, total <0.2%, (b) assembling of the components into an assembly;

(c) brazing the assembly without applying brazing flux onto the assembly components, and brazing the whole assembly in a dry inert gas atmosphere at a brazing temperature, and wherein an oxygen content of the dry inert gas atmosphere is less than 35 ppm, wherein the Mg in the inter-layer diffuses into the brazing clad layer material; and (d) cooling of the brazed assembly.

2. The method according to claim 1, wherein the brazing clad layer material has been pre-treated by means of etching with an alkaline or acidic etchant.

3. The method according to claim 1, wherein a dwell time at brazing temperature is in a range of 1 to 10 minutes.

4. The method according to claim 1, wherein the oxygen content of the dry inert gas atmosphere is less than 25 ppm.

5. The method according to claim 1, wherein the oxygen content of the dry inert gas atmosphere is controlled to be at least 5 ppm.

6. The method according to claim 1, wherein the assembly of joined components form a charge-air-cooler or oil cooler.

7. The method according to claim 3, wherein the dwell time at brazing temperature is in a range of 1 to 6 minutes.

8. The method according to claim 4, wherein the oxygen content of the dry inert gas atmosphere is less than 20 ppm.

9. The method according to claim 1, wherein the brazing clad layer material has a composition, consisting of, in weight percent:

| | |
|---|---|
| Si | 5% to 15%, |
| Mg | 0.1% to 0.5%, |
| Fe | up to 0.8%, |
| Cu | up to 0.3%, |
| Mn | up to 0.8%, |
| Zn | up to 0.25%, |
| Ti | up to 0.3%, | balance aluminium and unavoidable impurities each <0.05%, total <0.2%, wherein Mg is purposively present in the brazing clad layer material.

10. The method according to claim 1, wherein the brazing clad layer material has a composition, consisting of, in weight percent: Si 5% to 15%, Mg 0.1% to 0.5%, Fe up to 0.8%, Cu up to 0.3%, Mn up to 0.8%, Zn up to 0.25%, Ti up to 0.3%, balance aluminium and unavoidable impurities each <0.05%, total <0.2%, wherein Mg is purposively present in the brazing clad layer material.

11. The method according to claim 1, wherein the aluminium core alloy layer is made from an 3-series alloy having a composition consisting of, in weight percent:

| | |
|---|---|
| Mn | 0.8% to 1.5%, |
| Si | 0.25% to 0.75%, |
| Cu | 0.5% to 1.1%, |
| Fe | up to 0.45%, |
| Mg | up to 0.35%, |
| Cr | up to 0.25%, |
| Zr | up to 0.25%, |
| Ti | up to 0.20%, |
| Zn | up to 0.15%, | unavoidable impurities each <0.05%, total <0.2%, and balance aluminium.

12. The method according to claim 1, wherein the interlayer is made from 1xxx-series aluminium alloy having purposive addition of Mg of 0.10 wt. % to 1.0 wt. %.

13. The method according to claim 1, wherein the interlayer is made from 1xxx-series aluminium alloy having purposive addition of Mg of 0.10 wt. % to 0.7 wt. %.

* * * * *